United States Patent
Kubo (10) Patent No.: US 10,533,490 B2
(45) Date of Patent: Jan. 14, 2020

(54) SUPERCHARGING SYSTEM OF INTERNAL COMBUSTION ENGINE AND METHOD OF CONTROLLING SUPERCHARGING SYSTEM

(71) Applicant: MITSUBISHI HEAVY INDUSTRIES, LTD., Tokyo (JP)

(72) Inventor: Hiroyoshi Kubo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 122 days.

(21) Appl. No.: 15/535,564

(22) PCT Filed: Feb. 2, 2015

(86) PCT No.: PCT/JP2015/052864
§ 371 (c)(1),
(2) Date: Jun. 13, 2017

(87) PCT Pub. No.: WO2016/125238
PCT Pub. Date: Aug. 11, 2016

(65) Prior Publication Data
US 2017/0356332 A1    Dec. 14, 2017

(51) Int. Cl.
*F02B 37/16* (2006.01)
*F02B 37/013* (2006.01)
*F02D 41/00* (2006.01)

(52) U.S. Cl.
CPC ............ *F02B 37/16* (2013.01); *F02B 37/013* (2013.01); *F02B 37/162* (2019.05); *F02D 41/0007* (2013.01); *F02D 2200/0406* (2013.01)

(58) Field of Classification Search
CPC ........ F02B 37/16; F02B 37/013; F02B 37/12; F02B 37/127; F02B 37/18; F02B 37/183;
(Continued)

(56) References Cited

U.S. PATENT DOCUMENTS 4,691,521 A    9/1987  Hirabayashi et al.
7,062,910 B2 *  6/2006  Inoue .................. F02D 41/0007
                                                    60/602
(Continued)

FOREIGN PATENT DOCUMENTS

FR    2917128 A1    12/2008
JP    5-288111 A    11/1993
(Continued)

OTHER PUBLICATIONS

International Preliminary Report on Patentability dated Aug. 17, 2017, issued to International Application No. PCT/JP2015/052864 with an English Translation.
(Continued)

*Primary Examiner* — Thai Ba Trieu
(74) *Attorney, Agent, or Firm* — Birch, Stewart, Kolasch & Birch, LLP (57) ABSTRACT

A supercharging system for an internal combustion engine controls an intake flow-passage switching valve and an exhaust flow-passage switching valve disposed in an intake flow passage and an exhaust flow passage, respectively, on the basis of a first control index which is calculated on the basis of a target boost pressure calculated on the basis of an operational state of the internal combustion engine and an actual boost pressure. The first control index is calculated from an arithmetic expression including opening degrees of the intake flow-passage switching valve and the exhaust flow-passage switching valve as variables.

5 Claims, 7 Drawing Sheets (58) Field of Classification Search
CPC .............. F02B 37/186; F02D 41/0007; F02D 2200/0406; Y02T 10/144
USPC ................ 60/602, 605.1, 611–612; 123/562
See application file for complete search history.

(56) References Cited

U.S. PATENT DOCUMENTS

| | | | |
|---|---|---|---|
| 8,666,636 B2* | 3/2014 | Takahashi | F02D 41/0007 123/564 |
| 2009/0211248 A1 | 8/2009 | Andreae et al. | |
| 2010/0071658 A1* | 3/2010 | Soejima | F02D 41/0007 123/564 |
| 2011/0113773 A1 | 5/2011 | Liu et al. | |
| 2011/0296828 A1 | 12/2011 | An et al. | |
| 2016/0265468 A1* | 9/2016 | Takayanagi | F02D 41/0007 |
| 2018/0328269 A1* | 11/2018 | Aoyagi | F02D 41/0007 |

FOREIGN PATENT DOCUMENTS

| | | |
|---|---|---|
| JP | 2010-203426 A | 9/2010 |
| JP | 2011-99338 A | 5/2011 |
| JP | 4935094 B2 | 3/2012 |
| JP | 5324961 B2 | 7/2013 |
| JP | 2014-15846 A | 1/2014 |

OTHER PUBLICATIONS

International Search Report of PCT/JP2015/052864 dated May 12, 2015.
Extended European Search Report for European Application No. 15881055.6, dated Jun. 19, 2018.

* cited by examiner

SUPERCHARGING SYSTEM OF INTERNAL COMBUSTION ENGINE AND METHOD OF CONTROLLING SUPERCHARGING SYSTEM

TECHNICAL FIELD

The present disclosure relates to a supercharging system of an internal combustion engine which performs supercharging in a plurality of stages, and a method of controlling the supercharging system.

BACKGROUND ART

A turbocharger rotates an exhaust turbine by utilizing exhaust gas that flows through an exhaust channel and drives a turbo compressor coupled to the exhaust turbine, thereby supplying air to an internal combustion engine (supercharging). In relation to such a type of turbocharger, a two-stage turbo system is known, where a turbocharger is provided for each of the high-pressure side and the low-pressure side to perform two-stage supercharging to improve supercharging efficiency.

For instance, Patent Document 1 discloses a two-stage turbo system including a high-pressure stage turbocharger and a low-pressure stage turbocharger, wherein a high-pressure stage exhaust bypass valve, disposed in a high-pressure stage bypass flow passage that bypasses the high-pressure stage turbocharger, is configured to open in response to an increase in the flow rate of exhaust gas, whereby the operational range transitions from an operational range of the high-pressure stage turbocharger that uses the high-pressure stage exhaust bypass flow passage to an operational range of the low-pressure stage turbocharger that does not use the high-pressure stage exhaust bypass flow passage.

CITATION LIST

Patent Literature

Patent Document 1: JP4935094B

SUMMARY

Problems to be Solved

While the opening degree of only the high-pressure stage exhaust valve is controlled upon transition of the operational range in the above Patent Document 1, in a general two-stage turbocharger system, an operational range normally transitions from one to another while the opening degrees of a plurality of valves disposed in an intake flow passage and an exhaust flow passage are being adjusted to switch the flow passage. In this case, if the plurality of valves are not controlled smoothly in each operational range, the boost pressure may change when the valves are switched, and the engine output may also change. In Patent Document 1, only a single high-pressure stage exhaust valve is controlled, and thus the above problem cannot be solved.

An object of at least one embodiment of the present invention is to provide a supercharging system of an internal combustion engine and a control method of a supercharging system, whereby a plurality of valves disposed in an intake flow passage and an exhaust flow passage are smoothly controlled and thereby a change in the boost pressure can be suppressed when the valves are switched.

Solution to the Problems (1) A supercharging system for an internal combustion engine according to at least one embodiment of the present invention comprises: an internal combustion engine; a plurality of turbochargers driven by exhaust gas from the internal combustion engine; an intake flow-passage switching valve configured to be capable of switching an intake flow passage of the internal combustion engine; an exhaust flow-passage switching valve configured to be capable of switching an exhaust flow passage of the internal combustion engine; a target boost-pressure calculation part configured to calculate a target boost pressure on the basis of an operational state of the internal combustion engine; a boost-pressure detection part configured to detect a boost pressure of the plurality of turbochargers; and a control part configured to control the intake flow-passage switching valve and the exhaust flow-passage switching valve on the basis of a first control index which is calculated on the basis of the target boost pressure and the boost pressure. The first control index is calculated from an arithmetic expression including opening degrees of the intake flow-passage switching valve and the exhaust flow-passage switching valve as variables.

With the above configuration (1), the intake flow-passage switching valve and the exhaust flow-passage switching valve are controlled on the basis of the first control index calculated from an arithmetic expression including the opening degrees of the intake flow-passage switching valve and the exhaust flow-passage switching valve as variables. Accordingly, the intake flow-passage switching valve and the exhaust flow-passage switching valve can be regarded as one in terms of control, and thereby it is possible to control the intake flow-passage switching valve and the exhaust flow-passage switching valve disposed in the intake flow passage and the exhaust flow passage smoothly, thus suppressing the boost pressure change upon switch.

(2) In some embodiments, in the above configuration (1), the supercharging system further comprises a conversion table for converting the first control index into a second control index having a linear property with respect to the boost pressure. The control part is configured to convert the second control index calculated on the basis of the target boost pressure and the boost pressure into the first control index with the conversion table, and to control the intake flow-passage switching valve and the exhaust flow-passage switching valve on the basis of the first control index.

With the above configuration (2), the intake flow-passage switching valve and the exhaust flow-passage switching valve are controlled on the basis of the second control index having a linear property with respect to the boost pressure. Accordingly, compared to a case in which the control is based on the first control index that normally has a non-linear property with respect to the boost pressure, it is possible to control a plurality of valves smoothly with high accuracy and responsiveness.

(3) In some embodiments, in the above configuration (1) or (2), the second control index is determined so that the opening degree of the intake flow-passage switching valve decreases monotonically from a maximum value and then the exhaust flow-passage switching valve decreases monotonically from a maximum value, with an increase in the second control index.

(4) In some embodiments, in any one of the above configurations (1) to (3), the plurality of turbochargers comprises: a first turbocharger including a first turbo compressor disposed in the intake flow passage and a first exhaust turbine disposed in the exhaust flow passage; and a second turbocharger including a second turbo compressor disposed upstream of the first turbo compressor in the intake flow passage and a second exhaust turbine disposed downstream of the first exhaust turbine in the exhaust flow passage.

With the above configuration (4), it is possible to achieve the above effect in a multi-stage supercharging system equipped with the first turbocharger and the second turbocharger.

(5) In some embodiments, in the above configuration (4), the intake flow passage comprises: an intake in-line flow passage connected from outside to the internal combustion engine via the first turbo compressor and the second turbo compressor; and an intake bypass flow passage connecting an outlet side of the first turbo compressor to an outlet side of the second turbo compressor. The exhaust flow passage comprises: an exhaust in-line flow passage extending from the internal combustion engine to the outside via the second exhaust turbine and the first exhaust turbine; an exhaust first bypass flow passage connecting an inlet side of the second exhaust turbine and an inlet side of the first exhaust turbine; and an exhaust second bypass flow passage connecting an outlet side of the second exhaust turbine and a downstream side of a downstream connection point between the exhaust first bypass flow passage and the exhaust in-line flow passage. The intake flow-passage switching valve is a compressor bypass valve disposed in the intake bypass flow passage, and the exhaust switching valve is an exhaust flow-rate control valve disposed in the exhaust first bypass flow passage.

With the above configuration (5), it is possible to control the compressor bypass valve disposed in the intake flow passage and the exhaust flow-rate control valve disposed in the exhaust flow passage efficiently on the basis of the above control indexes.

(6) A method of controlling a supercharging system for an internal combustion engine comprising: an internal combustion engine; a plurality of turbochargers driven by exhaust gas from the internal combustion engine; an intake flow-passage switching valve configured to be capable of switching an intake flow passage of the internal combustion engine; and an exhaust flow-passage switching valve configured to be capable of switching an exhaust flow passage of the internal combustion engine, according to at least one embodiment of the present invention, comprises: a target boost-pressure calculation step of calculating a target boost pressure on the basis of an operational state of the internal combustion engine; a boost-pressure detection step of detecting a boost pressure of the plurality of turbochargers; and a control step of controlling the intake flow-passage switching valve and the exhaust flow-passage switching valve on the basis of a first control index which is calculated on the basis of the target boost pressure and the boost pressure. The first control index is calculated from an arithmetic expression including opening degrees of the intake flow-passage switching valve and the exhaust flow-passage switching valve as variables.

The above configuration (6) can be suitably performed by the above described supercharging system (including the above various embodiments) of the internal combustion engine.

Advantageous Effects

According to at least one embodiment of the present invention, it is possible to provide a supercharging system of an internal combustion engine and a control method of a supercharging system, whereby a plurality of valves disposed in an intake flow passage and an exhaust flow passage are smoothly controlled and a change in the boost pressure can be suppressed when the valves are switched.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
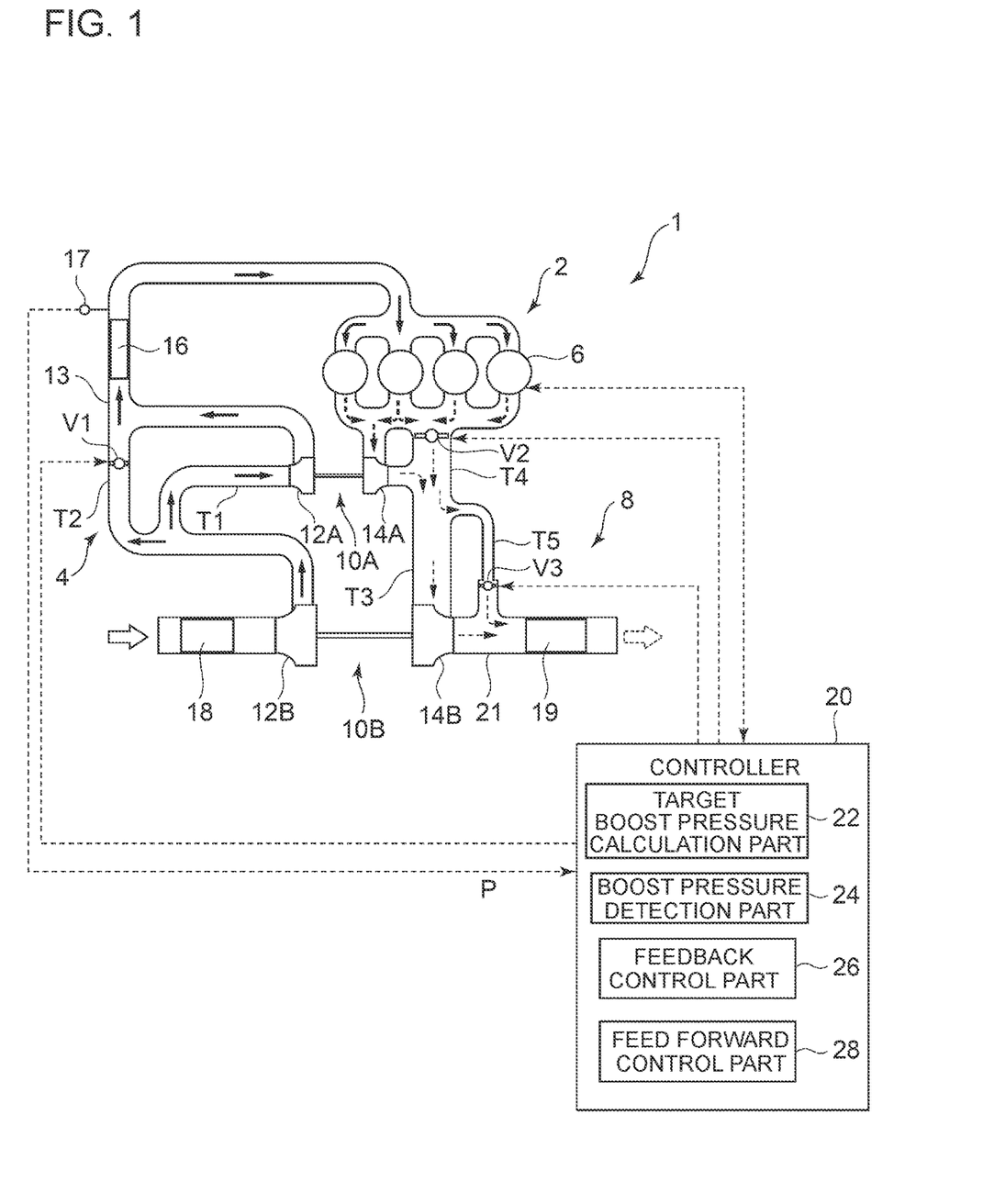
FIG. 1 is a schematic diagram illustrating an overall configuration of a supercharging system of an internal combustion engine according to an embodiment of the present invention.

FIG. 1 is a schematic diagram illustrating an overall configuration of a supercharging system (two-stage turbo system) 2 of an internal combustion engine 1 according to an embodiment of the present invention.

The internal combustion engine 1 is a four-cylinder diesel engine, for instance. Intake air introduced from an intake system 4 undergoes compressed ignition combustion with fuel supplied from a common rail (not depicted) in a combustion chamber 6, and thereby power is generated.

Exhaust gas produced in the combustion chamber 6 is discharged outside via an exhaust system 8.

It will be understood that the internal combustion engine 1 may be a gasoline engine.

The supercharging system 2 includes the first turbocharger 10A and the second turbocharger 10B. The first turbocharger 10A includes a turbo compressor 12A and an exhaust turbine 14A. The second turbocharger 10B includes a turbo compressor 12B and an exhaust turbine 14B. The two turbochargers 10A, 10B are turbochargers having substantially the same turbine capacity. In an in-line supercharging mode, the first turbocharger 10A on the upstream side of the exhaust flow passage functions as a high-pressure turbocharger, and the second turbocharger 10B on the downstream side of the exhaust flow passage functions as a low-pressure turbocharger.

The intake system 4 includes an intake in-line flow passage T1 connected to the internal combustion engine 1 via the turbo compressor 12A of the first turbocharger 10A and the turbo compressor 12B of the second turbocharger 10B from outside, and an intake bypass flow passage T2 connecting an outlet side of the turbo compressor 12A of the first turbocharger 10A and an outlet side of the turbo compressor 12B of the second turbocharger 10B. Further, a compressor bypass valve V1, which is an intake flow-passage switching valve, is disposed in the intake bypass flow passage T2. The compressor bypass valve V1 is a proportional control valve and is configured to be capable of controlling the flow rate continuously in accordance with the opening degree.

An inter cooler 16 for cooling supply air compressed and heated by a turbocharger is disposed between the internal combustion engine 1 and a downstream merging point 13 of the intake in-line flow passage T1 and the intake bypass flow passage T2. Further, an air cleaner 18 for purifying intake air is disposed in the vicinity of the inlet of the intake system 4.

The exhaust system 8 includes an exhaust in-line flow passage T3 extending from the internal combustion engine 1 to outside via the exhaust turbine 14B of the second turbocharger 10B and the exhaust turbine 14A of the first turbocharger 10A, an exhaust first bypass flow passage T4 connecting an inlet side of the exhaust turbine 14B of the second turbocharger 10B and an inlet side of the exhaust turbine 14A of the first turbocharger 10A, and an exhaust second bypass flow passage T5 connecting a downstream side of a downstream connection point between the exhaust first bypass flow passage T4 and the exhaust in-line flow passage T3 and the outlet side of the exhaust turbine 14B of the second turbocharger 10B. Further, an exhaust flow-rate control valve V2 is disposed in the exhaust first bypass flow passage T4, and a waste-gate valve V3 is disposed in the exhaust second bypass flow passage T5. The exhaust flow-rate control valve V2 and the waste-gate valve V3 are both an exhaust switching valve and is configured to be capable of controlling the flow rate continuously in accordance with the opening degree, thus serving as a proportional control valve.

A noise-canceling muffler 19 is disposed on the downstream side of a downstream merging point 21 between the exhaust in-line flow passage T3 and the exhaust second bypass flow passage T5, in the exhaust system 8.

The supercharging system 1 includes a controller 20, which is a control unit. The controller 20 is a computation processing unit, and includes a computation processing device such as a microprocessor. The controller 20 is capable of switching the flow passage of the intake system 4 and the exhaust system 8 by controlling the compressor bypass valve V1, the exhaust flow-rate control valve V2, and the waste-gate valve V3.

Specifically, the controller 20 includes, to perform the following control, a target boost pressure calculation part 22 for calculating a target boost pressure on the basis of an operational condition, a boost pressure detection part 24 for detecting a boost pressure of a turbocharger, and a feedback control part 26 for performing a feedback control on the first control index corresponding to the opening degrees of the compressor bypass valve V1 and the exhaust flow-rate control valve V2 on the basis of a difference between the target boost pressure and the boost pressure.

For instance, the feedback control is the PID control.

First Example

Figure 2:
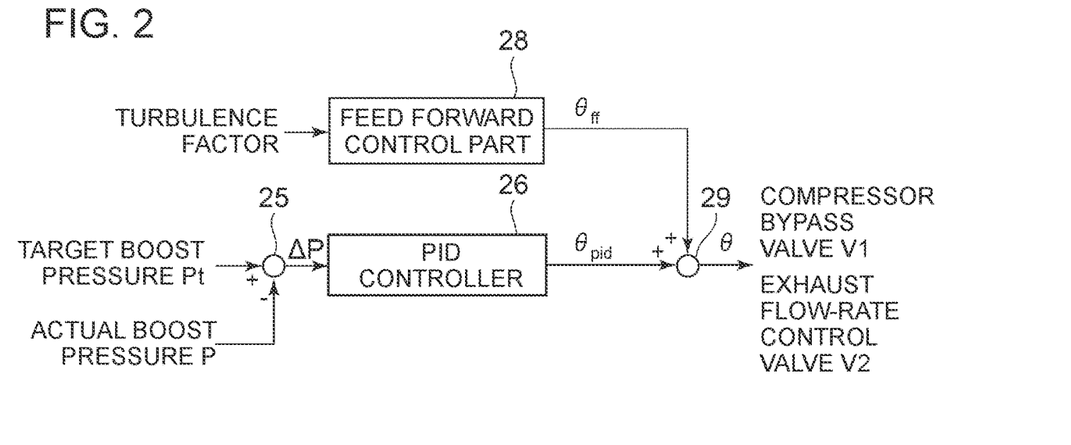
FIG. 2 is a schematic diagram with functional blocks, showing control logics of a controller according to the first working example.

FIG. 2 is a schematic diagram with functional blocks, showing control logics of the controller 20 in FIG. 1. In the working example 1, the first control index θ is introduced, for collectively controlling the compressor bypass valve and the exhaust flow-rate control valve. The opening degree of the compressor bypass valve V1 moves in the range of 0 to 100%, for instance. To standardize the opening degree, θ (zero to one in value) is introduced. The opening degree of the exhaust flow-rate control valve V2 moves in the range of 0 to 100%, for instance. To standardize the opening degree, θ (one to two in value) is introduced. The relationship between the opening degree of the compressor bypass valve V1, the opening degree of the exhaust flow-rate control valve V2, and θ is as shown in FIG. 3.

Figure 3:
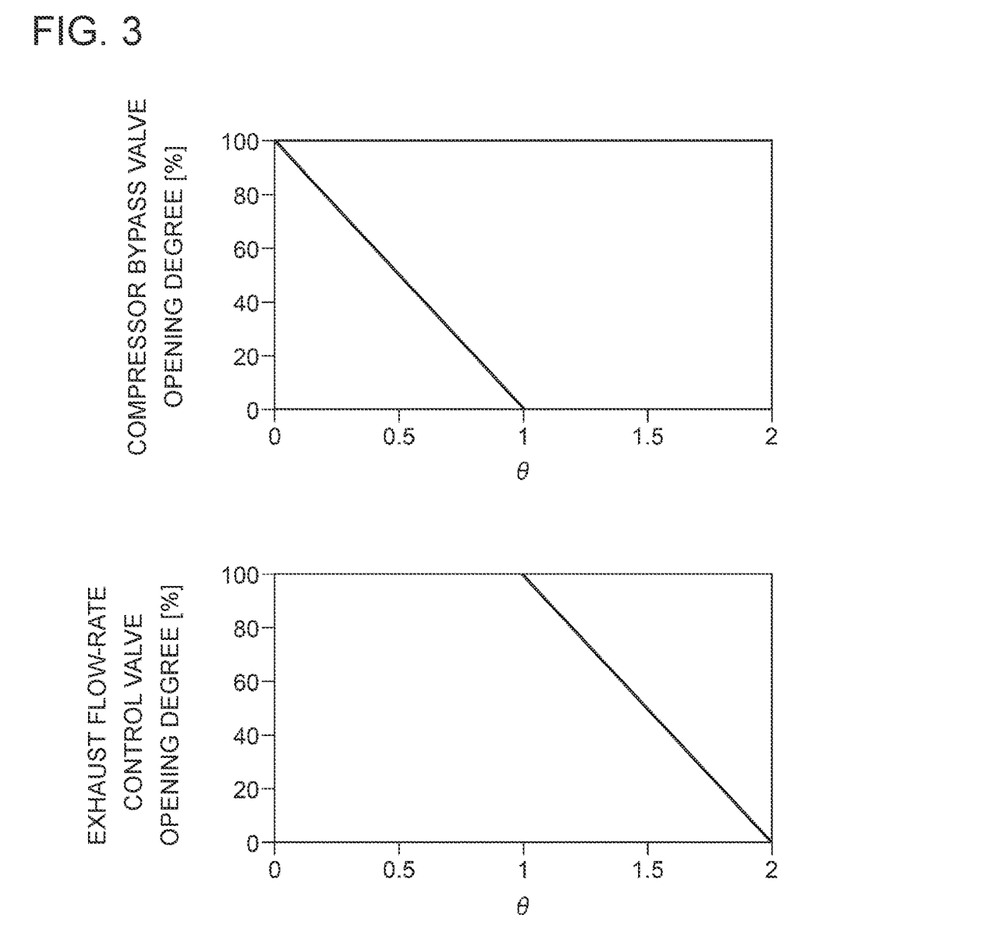
FIG. 3 is a graph showing a relationship between the first control index and the opening degrees of a compressor bypass valve and an exhaust flow-rate control valve.

FIG. 3 is a graph showing the relationship between the first control index and the opening degrees of the compressor bypass valve V1 and the exhaust flow-rate control valve V2. Specifically, the first control index θ is set so as to depend only on the opening degree of the compressor bypass valve V1 in the range of $0 \leq \theta < 1$, and only on the opening degree of the exhaust flow-rate control valve V2 in the range of $1 \leq \theta < 2$. In other words, if the first control index θ is changed continuously, only the compressor valve V1 operates in accordance with the first control index θ in the range of $0 \leq \theta < 1$, while only the exhaust flow-rate control valve V2 operates in the range of $1 \leq \theta < 2$. Accordingly, a switch control is performed on the compressor bypass valve V1 and the exhaust flow-rate valve V2 across the boundary of $\theta = 1$.

Figure 4:
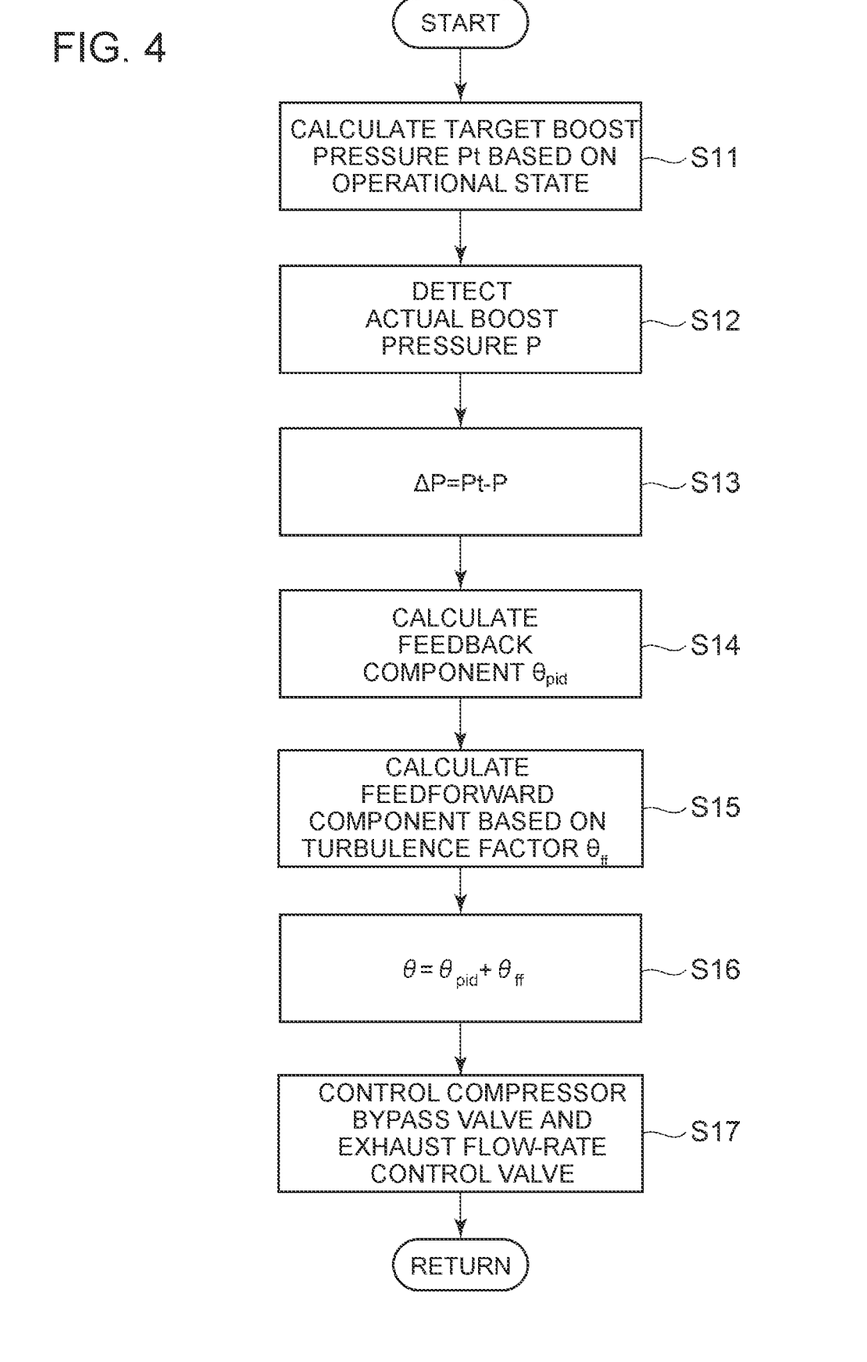
FIG. 4 is a flowchart showing steps of a control method performed by the control logics in FIG. 2.

Next, with reference to FIG. 4, a control method performed on the basis of the control logics of FIG. 2 will be described in detail. FIG. 4 is a flowchart showing steps of a control method performed by the control logics in FIG. 2.

First, the target boost pressure calculation part 22 obtains a target boost pressure Pt corresponding to an operational state (step S11). The operational state is determined from the fuel injection amount and the engine rotation speed, for instance, and the target boost pressure Pt is determined on the basis of the operational state. For instance, if a driver steps on an accelerator pedal to demand an output increase, the target boost pressure Pt increases with an increase in the fuel injection amount and the engine rotation speed. Such a relationship between the target boost pressure Pt and the operational state is stored as a map (not depicted) in a storage device such as a memory in advance, and the target boost pressure Pt can be calculated by reading the map.

Next, the boost pressure detection part 24 obtains a detection signal from a boost pressure sensor 17 disposed downstream of the merging point 13 of the intake pipe 4, and thereby obtains an actual value P of the boost pressure (hereinafter, referred to as "actual boost pressure" when needed) (step S12). A subtractor 25 obtains the boost pressure Pt obtained in step S11 and the actual boost pressure P obtained in step S12, and outputs a difference ΔP therebetween (step S13). The difference ΔP is input to a PID controller 26, and a feedback component $\theta_{pid}$ is output by computation (step S14).

The PID controller 26 computes the feedback component $\theta_{pid}$ from the following expression (2):

$$\text{Operation amount } \theta_{pid} = Kp \times \text{difference} + Ki \times \text{cumulative difference} + Kd \times \text{difference from previous value} \quad (2)$$

On the right side of the expression, the first term is a proportional term, the second term is an integral term, and the third term is a derivative term. The coefficients Kp, Ki, and Kd may be set by obtaining optimum values from an actual control in a cut-and-try test. For instance, a known method such as the step response and the threshold sensitivity can be used.

Further, in the present embodiment, a feed forward control part 28 is additionally provided. The feed forward control part 28 obtains a disturbance factor, and outputs a feed forward component $\theta_{ff}$ to suppress change (disturbance) of the boost pressure that occurs due to the disturbance factor (step S15). The feed forward component $\theta_{ff}$ is added to the feedback component $\theta_{pid}$ at an adder 29, and the first control index θ is obtained by the following expression (3) (Step S16):

$$\theta = \theta_{pid} + \theta_{ff} \quad (3)$$

With the above feed forward control part 28 being provided, responsiveness to a turbulence input improves.

Further, the compressor bypass valve V1 and the exhaust flow-rate control valve V2 are controlled on the basis of the first control index θ calculated on the basis of the above expression (3) (step S17). As described above, in the present working example, the compressor bypass valve V1 and the exhaust flow-rate control valve V2 are integrated in terms of control, on the basis of the first control index θ, and thereby it is possible to control a plurality of valves smoothly.

Second Example

In the above described working example 1, the feedback component from the PID control part 26 is outputted as the first control index θ to control the compressor bypass valve V1 and the exhaust flow-rate control valve V2. The first control index θ normally has a non-linear property with respect to the boost pressure, and thus there is room to improve controllability. This can be solved by the following working example 2.

Figure 5:
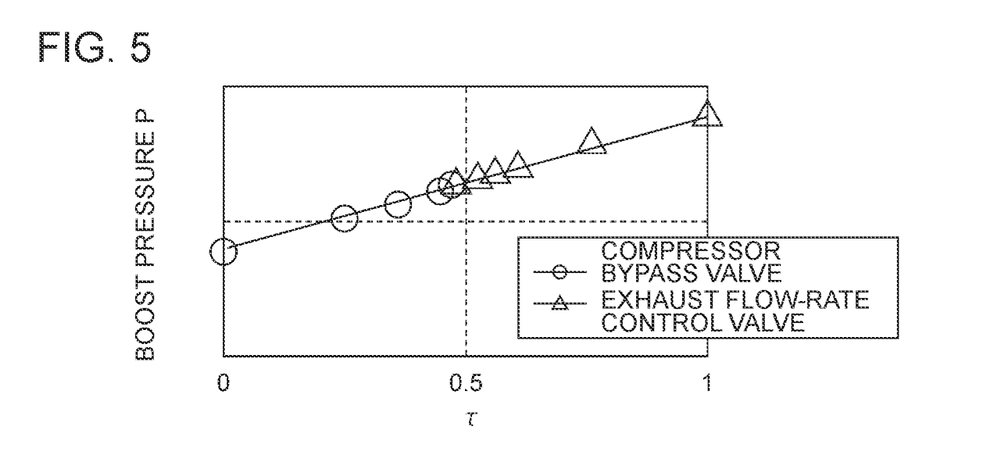
FIG. 5 is a characteristic graph showing the relationship between the second control index and the boost pressure.
Figure 6:
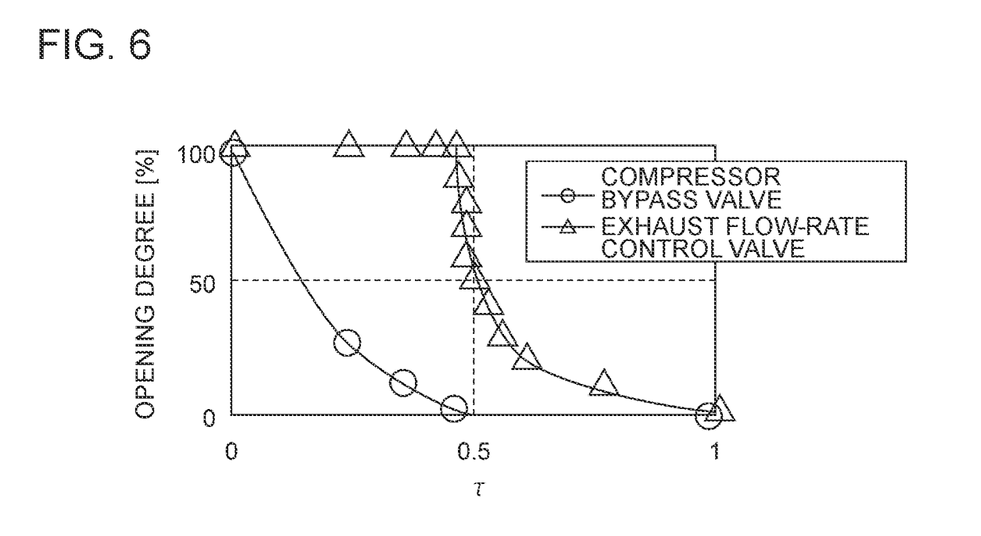
FIG. 6 is a graph showing a relationship between the second control index and the opening degrees of a compressor bypass valve and an exhaust flow-rate control valve.
Figure 7:
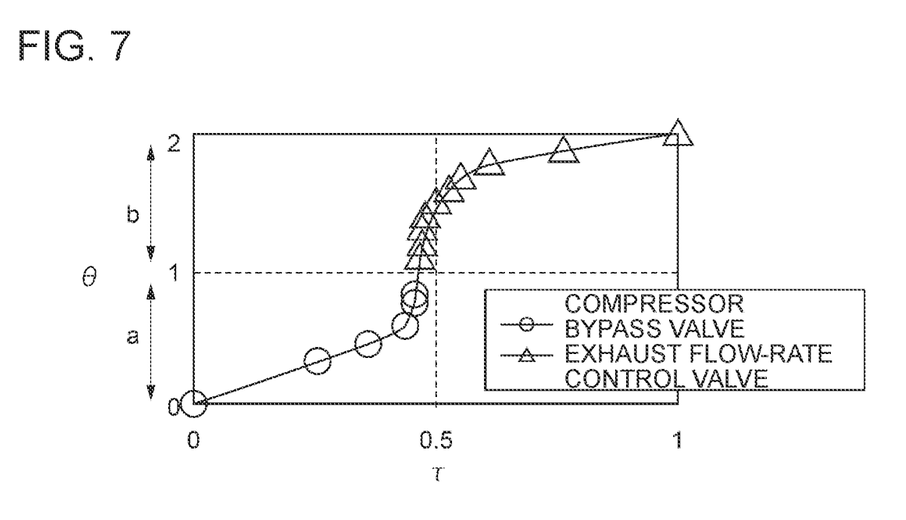
FIG. 7 is a graph showing the relationship between the first control index and the second control index.

FIG. 5 is a characteristic graph showing the relationship between the second control index τ and the boost pressure P. FIG. 6 is a graph showing a relationship between the second control index τ and the compressor bypass valve V1 and the exhaust flow-rate control valve V2. FIG. 7 is a graph showing the relationship between the first control index θ and the second control index τ.

In FIGS. 5 to 7, the hollow circle markers show data corresponding to the compressor bypass valve V1, and the hollow triangle markers show data corresponding to the exhaust flow-rate control valve V2.

In the second working example, the feedback output of the PID controller 26 is output as the second control index τ having a linear property with respect to the boost pressure. The second control index τ has a linear property with respect to the boost pressure, as depicted in FIG. 5. As depicted in FIG. 6, the second control index τ has a property with respect to the compressor bypass valve V1 and the exhaust flow-rate control valve V2.

The second control index τ is mutually convertible with the first control index θ. Specifically, the storage device such as a memory stores in advance a conversion table 30 that defines a relationship between the first control index θ and the second control index τ as depicted in FIG. 7, which can be read out when needed. An equation for converting the first control index θ having a non-linear property into the second control index having a linear property is normally complex, and thus having such an equation defined in advance in form of the conversion table 30 reduces processing loads, thus resulting in a reduced memory capacity and an improved processing speed, whereby high responsiveness can be achieved.

Figure 8:
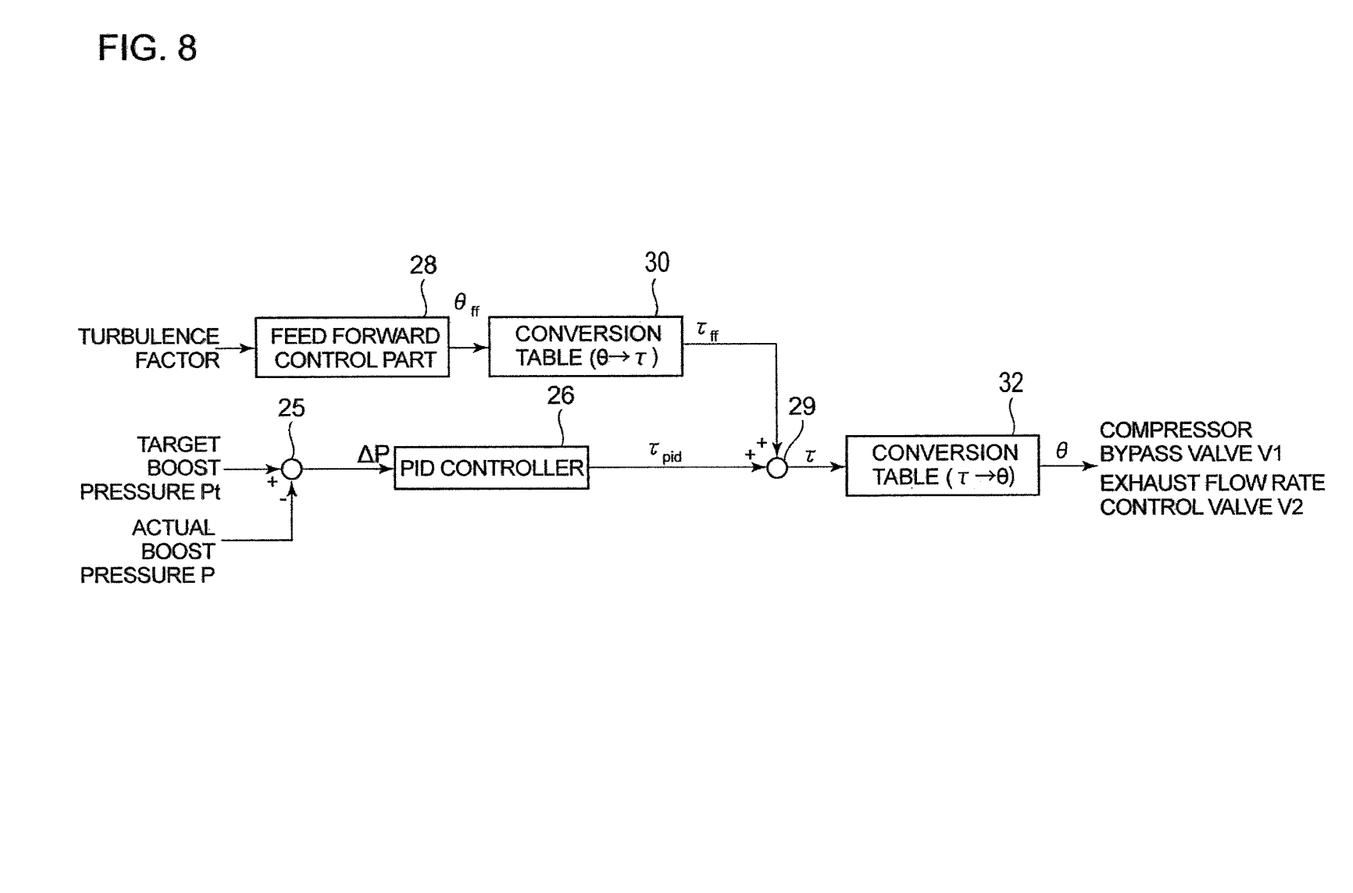
FIG. 8 is a schematic diagram with functional blocks, showing control logics of a controller according to the second working example.
Figure 9:
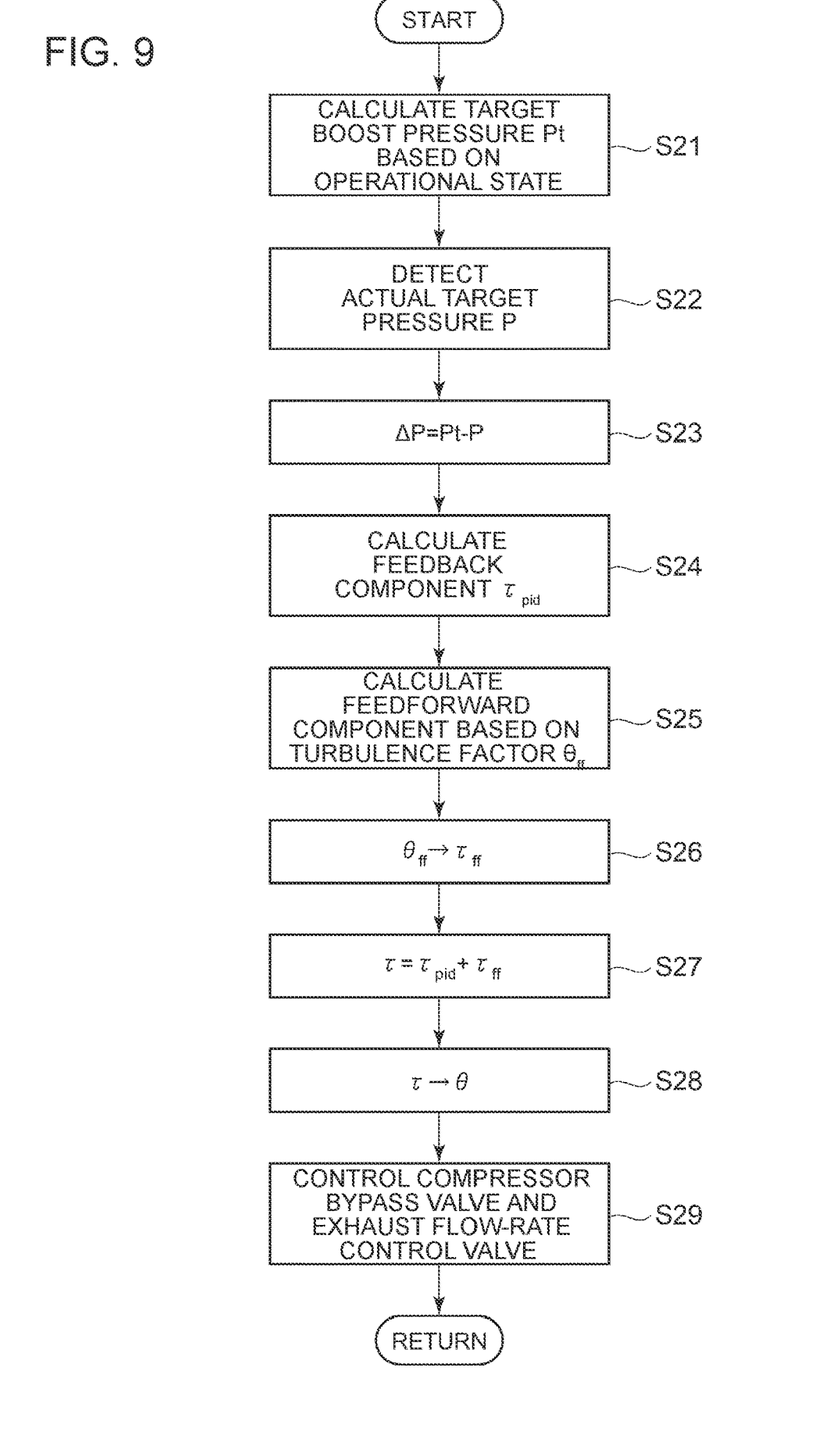
FIG. 9 is a flowchart showing steps of a control method performed by the control logics in FIG. 8.

With reference to FIGS. 8 and 9, a control method according to the second working example will be described. FIG. 8 is a schematic diagram with functional blocks, showing control logics of the controller 20 according to the second working example. FIG. 9 is a flowchart showing steps of a control method performed by the control logics in FIG. 8.

Steps S21 to S23 in FIG. 8 are similar to steps S11 to S13 in FIG. 4 (working example 1), and overlapping parts are not described in detail.

The PID controller 26 obtains a difference ΔP outputted from the subtractor 25, and calculates a feedback component $\tau_{pid}$ by computation (step S24). The feedback component $\tau_{pid}$ is calculated from the following expression (4):

$$\text{Operation amount } \tau_{pid} = kp \times \text{difference} + ki \times \text{cumulative difference} + kd \times \text{difference from previous value} \quad (4)$$

On the right side of the expression, the first term is a proportional term, the second term is an integral term, and the third term is a derivative term. The coefficients kp, ki, and kd may be set by obtaining optimum values from an actual control in a cut-and-try test. For instance, a known method such as the step response and the threshold sensitivity can be used.

The feed forward control part 28 outputs a feed forward component $\theta_{ff}$ generated by a turbulence factor, similarly to the first working example (step S25). The feed forward component $\theta_{ff}$ is converted into a feed forward component $\tau_{ff}$ corresponding to the second control index τ with the conversion table 30 (step S26), and then is added to the feedback component $\tau_{pid}$ by the adder 29. Accordingly, the second control index τ, which is an operation amount, can be obtained from the following expression (5) (step S27):

$$\tau = \tau_{pid} + \tau_{ff} \quad (5)$$

The second control index τ obtained as described above is converted into the first control index θ by using the conversion table 30 (step S27), and the second control index τ is converted into the first control index θ (step S28). Further, the compressor bypass valve V1 and the exhaust flow-rate control valve V1 are controlled on the basis of the first control index θ with the conversion table 32 (step S29).

As described above, according to the second working example, the compressor bypass valve V1 and the exhaust flow-rate control valve V2 are controlled on the basis of the second control index τ having a linear property with respect to the boost pressure, and thus it is possible to control a plurality of valves smoothly with high responsiveness.

INDUSTRIAL APPLICABILITY

The present disclosure can be suitably applied to a supercharging system of an internal combustion engine which performs supercharging in a plurality of stages, and a method of controlling a supercharging system.

DESCRIPTION OF REFERENCE NUMERALS

1 Supercharging system
2 Internal combustion engine (engine)
4 Intake system
6 Combustion chamber
8 Exhaust system
10A High-pressure side turbocharger
10A Low-pressure side turbocharger
12A High-pressure side turbo compressor
12B Low-pressure side turbo compressor
13 Merging point
14A High-pressure side exhaust turbine
14B Low-pressure side exhaust turbine
16 Inter cooler
18 Air cleaner
19 Muffler
20 Controller
21 Merging point
22 Target boost pressure calculation part
24 Boost pressure detection part
25 Subtractor
26 PID controller
28 Feed forward control part
29 Adder
30 Conversion table
32 Conversion table

The invention claimed is:

1. A method of controlling a supercharging system for an internal combustion engine including: a plurality of turbochargers driven by exhaust gas from the internal combustion engine; an intake flow-passage switching valve switching an intake flow-passage that provides intake air to the internal combustion engine; and an exhaust flow-passage switching valve switching an exhaust flow-passage that discharges exhaust gas from the internal combustion engine, a boost pressure sensor obtaining an actual boost pressure of the intake air in the intake flow-passage downstream of the plurality of turbochargers with respect to a flow direction of the intake air, and a controller, the method comprising:

obtaining an operational state of the internal combustion engine by the controller from a fuel injection amount and a rotational speed of the internal combustion engine;

calculating a target boost pressure by the controller on the basis of the obtained operational state of the internal combustion engine;

detecting an actual boost pressure of the intake air in the intake flow-passage downstream of the plurality of turbochargers with respect to a flow direction of the intake air by the boost pressure sensor;

controlling, by the controller, the intake flow-passage switching valve and the exhaust flow-passage switching valve based on a first control value which is calculated based a difference between the target boost pressure and the actual boost pressure;

calculating, by the controller, the first control value from an arithmetic expression including opening degrees of the intake flow-passage switching valve and the exhaust flow-passage switching valve as variables;

converting, by the controller, the first control value into a second control value having a linear property with respect to the actual boost pressure by using a first conversion table;

converting, by the controller, the second control value into the first control value with a second conversion table; and controlling, by the controller, the intake flow-passage switching valve and the exhaust flow-passage switching valve based on the first control value converted from the second control value.

2. A supercharging system for an internal combustion engine, comprising:

a plurality of turbochargers driven by exhaust gas from the internal combustion engine;

an intake flow-passage switching valve switching an intake flow-passage that provides intake air to the internal combustion engine;

an exhaust flow-passage switching valve switching an exhaust flow-passage that discharges exhaust gas from the internal combustion engine;

a boost pressure sensor obtaining an actual boost pressure of the intake air in the intake flow-passage downstream of the plurality of turbochargers with respect to a flow direction of the intake air; and a controller having executable instructions stored on a microprocessor to:

obtain an operational state of the internal combustion engine from a fuel injection amount and a rotational speed of the internal combustion engine;

calculate a target boost pressure based on the operational state of the internal combustion engine from a map;

detect the actual boost pressure of the plurality of turbochargers from an output of the boost pressure sensor; and control the intake flow-passage switching valve and the exhaust flow-passage switching valve based on a first control value which is calculated based on a difference between the target boost pressure and the actual boost pressure, the first control value being calculated from an arithmetic expression including opening degrees of the intake flow-passage switching valve and the exhaust flow-passage switching valve as variables;

convert the first control value into a second control value having a linear property with respect to the actual boost pressure with a first conversion table;

convert the second control value into the first control value with a second conversion table; and control the intake flow-passage switching valve and the exhaust flow-passage switching valve based on the first control value converted from the second control value.

3. The supercharging system for an internal combustion system according to claim 2, wherein the opening degree of the intake flow-passage switching valve decreases monotonically from 100% and then the exhaust flow-passage switching valve decreases monotonically from 100%, with an increase in the second control value.

4. The supercharging system for an internal combustion engine according to claim 2, wherein the plurality of turbochargers comprises:

a first turbocharger including a first turbo compressor disposed in the intake flow-passage and a first exhaust turbine disposed in the exhaust flow-passage; and a second turbocharger including a second turbo compressor disposed upstream of the first turbo compressor in the intake flow-passage and a second exhaust turbine disposed downstream of the first exhaust turbine in the exhaust flow-passage.

5. The supercharging system according to claim 4,
wherein the intake flow-passage comprises:
- an intake in-line flow-passage connected from outside to the internal combustion engine via the first turbo compressor and the second turbo compressor; and
- an intake bypass flow-passage connecting an outlet side of the first turbo compressor to an outlet side of the second turbo compressor, wherein the exhaust flow-passage includes:
- an exhaust in-line flow-passage extending from the internal combustion engine to the outside via the second exhaust turbine and the first exhaust turbine;
- an exhaust first bypass flow-passage connecting an inlet side of the second exhaust turbine and an inlet side of the first exhaust turbine; and
- an exhaust second bypass flow-passage connecting an outlet side of the second exhaust turbine and a downstream side of a downstream connection point between the exhaust first bypass flow-passage and the exhaust in-line flow-passage, wherein the intake flow-passage switching valve is a compressor bypass valve disposed in the intake bypass flow-passage, and wherein the exhaust switching valve is an exhaust flow-rate control valve disposed in the exhaust first bypass flow-passage.

\* \* \* \* \*